United States Patent [19]

Kase et al.

[11] Patent Number: 5,740,147
[45] Date of Patent: Apr. 14, 1998

[54] PHASE COMPENSATION OF OPTICAL ELEMENTS BY TILTING A HALF WAVE PLATE IN A MAGNETO-OPTIC DISK HEAD

[75] Inventors: Toshiyuki Kase; Hiroshi Nishikawa, both of Tokyo, Japan

[73] Assignee: Asahi Kogaku Kogyo Kabushiki Kaisha, Tokyo, Japan

[21] Appl. No.: 685,973

[22] Filed: Jul. 22, 1996

[30] Foreign Application Priority Data

Jul. 25, 1995 [JP] Japan .................... 7-189463

[51] Int. Cl.$^6$ .................... G11B 7/95; G11B 19/02
[52] U.S. Cl. .................... 369/110; 369/13; 369/110; 369/112; 369/44.14; 369/44.32
[58] Field of Search .................... 369/13, 44.32, 369/110, 112, 116, 109, 44.14

[56] References Cited

U.S. PATENT DOCUMENTS

| | | | |
|---|---|---|---|
| 4,953,124 | 8/1990 | Koyama | 369/110 |
| 5,223,970 | 6/1993 | Oono et al. | 369/112 |
| 5,282,188 | 1/1994 | Gage | 369/110 |
| 5,297,114 | 3/1994 | Itoh et al. | 369/44.32 |
| 5,309,423 | 5/1994 | Noguchi et al. | 369/110 |
| 5,341,246 | 8/1994 | Oono et al. | 359/837 |
| 5,426,626 | 6/1995 | Katayama | 369/44.14 |
| 5,471,456 | 11/1995 | Tokumaru et al. | 369/112 |
| 5,539,718 | 7/1996 | Hoshi et al. | 369/116 |
| 5,589,244 | 12/1996 | Takada | 369/13 |

FOREIGN PATENT DOCUMENTS 6230222   8/1994   Japan .

*Primary Examiner*—David C. Nelms
*Assistant Examiner*—Kim-Kwok Chu
*Attorney, Agent, or Firm*—Greenblum & Bernstein, P.L.C.

[57] ABSTRACT

A laser beam emitted from a laser diode passes through a first polarization beam splitter to form a spot on a magnetic film of a magneto-optic disk. The plane of polarization of the laser beam reflected at the magneto-optic disk rotates, due to the Kerr effect, in a fixed direction in accordance with the direction of magnetization of the magnetic film. The laser beam then passes through a half-wave plate. The half-wave plate is attached on a base plate and tilted with respect to the optical axis of the laser beam so that its phase difference along the optical axis compensates the phase difference of the entire optic system. The laser beam passed through the half-wave plate is separated by the second beam splitter into a P polarization component and S polarization component, which are respectively detected by photodiodes.

13 Claims, 3 Drawing Sheets

PHASE COMPENSATION OF OPTICAL ELEMENTS BY TILTING A HALF WAVE PLATE IN A MAGNETO-OPTIC DISK HEAD

BACKGROUND OF THE INVENTION

1. Field of the Invention

The present invention relates to an information reproducing device of a magneto-optic disk device for reproducing information recorded on a magneto-optic disk.

2. Description of the Related Art

A magneto-optic disk device records digitized information as a direction of magnetization of each magnetic domain of a magnet film formed on the surface of a disk by irradiating a high energy laser beam and applying an external magnetic field of which direction is suitably inverted according to the digitized information on each magnetic domain. Also, the magneto-optic disk device reproduces information recorded on the magneto-optic disk. During reproduction, the magneto-optic disk device irradiates a laser beam consisting of linearly polarized light having a plane of polarization oriented in a predetermined direction to the magnetic domains of the magnetic film formed on the magneto-optic disk. Then, the direction of the plane of polarization of the laser beam that is reflected by the respective magnetic domains is rotated in either the +direction or −direction depending on the direction of magnetization of the respective domains by Kerr effect. The magneto-optic disk device can therefore reproduce the information recorded on the magneto-optic disk as an electrical signal by detecting the changes in direction of the plane of polarization of the reflected beam. Such an information reproducing device of a magneto-optic disk device is typically of a polarization beam splitter (PBS) which transmits laser light emitted from a semiconductor laser and separates the laser beam reflected by the magneto-optic disk from the incident optical path. A half-wave plate rotates the plane of polarization of the separated laser beam by the polarization beam splitter.

FIG. 3 shows the state of polarization of a laser beam after passing through a half-wave plate in an information reproducing device above. The abscissa axis (P-axis) of FIG. 3 represents the direction of the plane of polarization of the laser beam that is incident on the magneto-optic disk, while the P'-axis indicates the direction of the plane of polarization of the laser beam that has passed through the half-wave plate, which has been optically rotated by 45 degrees by the half-wave plate. Consequently, depending on the direction of magnetization of the magnetic domain from which this laser beam was reflected, the direction of plane of polarization of the laser beam after passing through the half-wave plate is in a direction rotated by $-\theta k$ degrees or $+\theta k$ degrees (i.e. the Kerr angle) about axis P'. In summary, the direction of the plane of polarization of the laser beam is suitably rotated in accordance with the recorded information between the two angles: $((45+\theta k)$ degrees and $(45-\theta k)$ degrees) while the laser beam maintains a fixed amplitude. The information reproducing device can therefore reproduce the information recorded on the magneto-optic disk by separating this laser beam into a component in the P axial direction and a component in the S axial direction, and detecting variation of difference between the intensity of the component in the P axial direction and the intensity of the component in the S axial direction.

Now, if each of optical elements constituting the information reproducing device have no phase difference (i.e., no difference in refractive indexes in the P axial direction and S axial direction), the condition of polarization of the laser beam passed through the half-wave plate is perfectly linearly polarized, as shown in FIG. 3. However, since the optical elements unavoidably have a phase difference, every time the laser beam is transmitted through or reflected by these optical elements, the condition of polarization of the laser beam is affected by phase differences. As a result, the polarization condition of the laser beam passed through the half-wave plate becomes elliptical polarization as shown in FIG. 4. The amplitude of the elliptically polarized laser beam is smaller than the amplitude of the linearly polarized light of the same energy within a plane of the polarization of the linearly polarized laser beam. Therefore, the variation of intensity of the elliptically polarized laser beam in each axial direction is also less than that of the linearly polarized laser beam, causing a degradation of the S/N ratio.

Various techniques have been adopted to eliminate phase differences caused by the optical elements in the information reproducing device. For example, efforts have been made to eliminate phase difference at the component level by suitable adjustment of the material and/or thickness of a coat applied to each optical element. However, in order to eliminate the phase difference in each of the optical elements, the accuracy of the components must be raised by a considerable degree. As a result, the yield of each optical element is poor with cost increases, even if the accuracy of the components is raised to an extent sufficient to reduce the phase difference caused by the individual optical elements to about +/−5 degrees, for example.

In another case, an optical element dedicated to phase compensation, such as a Babinet-Soleil phase compensator or Ehringhaus compensation plate, has been inserted and adjusted in the optical path to compensate phase differences which have occurred.

However, if the optical element dedicated to phase compensation is inserted in the optical path, the total number of components of the information reproducing device is increased, the apparatus as a whole is increased in size. Costs are also increased. Moreover, a Babinet-Soleil phase compensator is equipped with an adjustment device for altering the amount of phase compensation, which is useless once the adjustment has been completed and phase compensation has been effected. As a result, the size of the apparatus is wastefully large and expensive.

SUMMARY OF THE INVENTION

It is a primary object of the present invention, which was contrived in view of the above problem, to obtain a high S/N ratio without increasing the number of components and/or costs by performing phase compensation using one of optical components of an information reproducing device.

In order to solve this problem, an information reproducing device according to the present invention comprises a device for irradiating polarized light on a magnetic film of a magneto-optic disk. A retarder optically rotates the polarized light which is arranged to obliquely intersect an optical path of the polarized light that is reflected by the magnetic film. A separating optical element separates only the polarized component in a predetermined direction of the polarized light that has passed through the retarder. A device detects the polarization component of the polarized light separated by the separating optical element.

Perfect phase difference compensation can be achieved if the angle of the retarder with respect to the optical path is adjusted so that the phase difference introduced by the optical path length of the polarized light within this retarder cancels the phase difference caused by the entire optical system other than the retarder from the irradiating device to the detecting device. The phase difference thus introduced by the retarder coincides with a value obtained by subtracting from 180 degrees the phase difference caused by the entire optical system other than the retarder from the irradiating device to the detecting device.

A half-wave plate preferably employed as the retarder. The thickness of the retarder may be less than the thickness at which the phase difference introduced by the half-wave plate, when inserted perpendicular to the optical path, becomes exactly 180 degrees. This is because, even with such a retarder, a function as a half-wave plate can be achieved by insertion in inclined manner with respect to the optical path. If the retarder is employed as a half-wave plate, the angle of optical rotation by this half-wave plate is twice the angle of the optic axis of the half-wave plate with respect to the plane of polarization of the incident light. This angle can be several degrees, but, if the half-wave plate is arranged so that the plane of polarization of the polarized light irradiated by the irradiating means is rotated by 45 degrees, the optical elements can be provided on the same base plate.

By cementing the half-wave plate and the separating optical element, tilting of the half-wave plate can be achieved together with the separating optical element.

The separating optical system may have a construction wherein only the polarization component in one direction emerges, or may have a construction wherein polarization components in a plurality of directions emerge separately. In the first-mentioned case, it could be constituted for example by a polarizing filter that transmits only the polarization component in a specific direction. In the latter case, it may be constructed wherein the polarized light is separated into two polarized components having directions which are mutually orthogonal. In this case, the photodetector means detects respective polarization components separated by this separating optical element. The separating optical element can be a polarization beam splitter that separates incident polarized light into its S polarization component and its P polarization component.

The directions of the polarization components separated by the separating optical element may be chosen at will, but, when the polarized light is separated into two components having directions which are mutually orthogonal, these directions preferably are at angles of 45 degrees with respect to a direction which is average of the polarization directions of the polarized light. If so, the polarization components will be of the same intensity and inverse phase, such that in-phase noise is cancelled by taking the difference of the detected signals based on the components.

BRIEF DESCRIPTION OF THE DRAWINGS

The invention will be described below in detail with reference to the accompanying drawings in which.

DESCRIPTION OF THE PREFERRED EMBODIMENTS

The present disclosure relates to subject matter contained in Japanese Patent Application No. 7-189463 (filed on Jul. 25, 1995), which is expressly incorporated herein by reference in its entirety.

Preferred embodiments of the present invention will now be described referring to the accompanying drawings.

First Embodiment

The first embodiment shows an example in which a half-wave plate and a second polarizing beam splitter are arranged separately.

Figure 1:
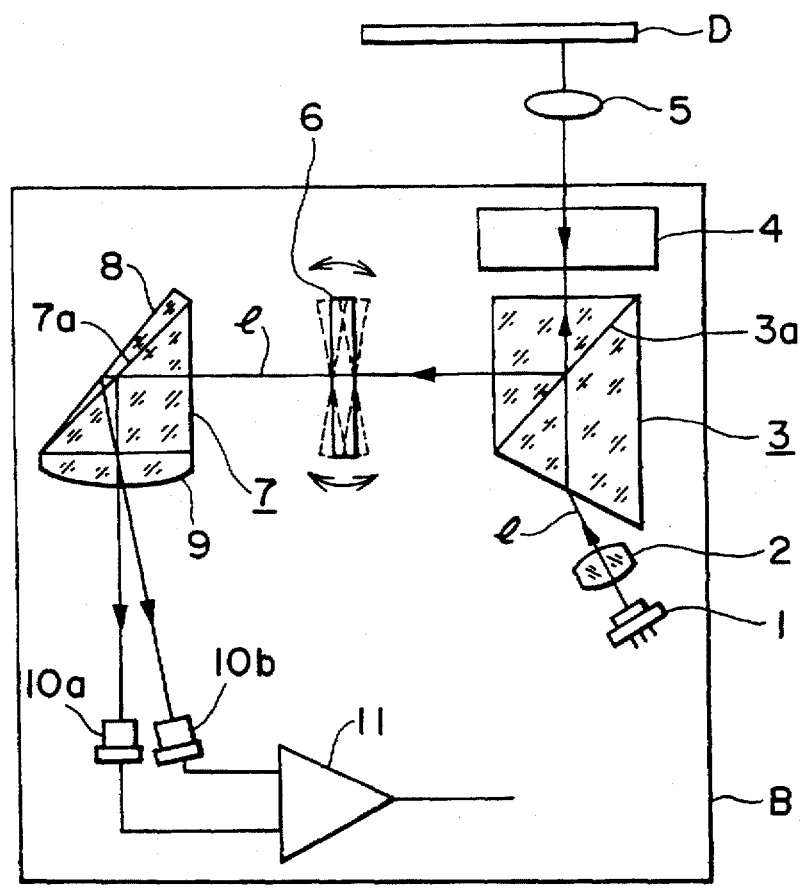
FIG. 1 is an optical layout diagram illustrating major parts of an information reproducing device according to a first embodiment of the present invention.

FIG. 1 is an optical layout diagram showing the structure corresponding to the information reproducing device in a pick-up device of a magneto-optic disk device. Depiction of a writing device for recording information on a magneto-optic disk D is therefore omitted from FIG. 1. However, in the following description, it will be assumed that the digitized information has already been recorded on the magneto-optic disk D shown in FIG. 1 by means of the writing device, not shown, and that the magnetic domains are magnetized upwards or downwards in the thickness direction corresponding to bits of the digitized information.

In FIG. 1, a laser beam emitted from a laser diode 1 passes through a collimator lens 2, a first polarization beam splitter 3, a mirror 4, and an objective lens 5, and converges on a magneto-optic disk D. The reflected laser beam from the magneto-optic disk D returns to the first polarization beam splitter 3 along the same optical path and. Passing through a half-wave plate 6, the reflected laser beam is incident on a second polarization beam splitter 7, where it is separated into two beams. The first separated beam passes directly through a condenser lens 9 and is directed to a first photodiode 10a. The second separated beam, after entering an optical wedge 8, is reflected onto the second polarization beam splitter 7. The second separated beam passes through the condenser lens 9 along an optical path different from the optical path of the first beam, and is directed to a second photodiode 10b. All these optical elements (except for the mirror 4 and the objective lens 5) are fixed on a base plate B. It should be noted that 5 the plane of incidence of the first polarization beam splitter 3 is parallel to the "paper" surface of FIG. 1. Consequently, through the whole optical path of the laser beam within the reproducing device, a component of linear polarization in a direction parallel to the paper surface of FIG. 1 will be called a P polarization component, while a component of linear polarization in a direction normal to the paper surface of FIG. 1 will be called an S polarization component.

The various optical elements will now be described. The laser diode 1 emits a linearly polarized laser beam having only a P polarization component. The collimator lens 2 collimates the laser beam.

The first polarization beam splitter 3 has the shape of a quadrangular prism with trapezoidal surface, as shown in FIG. 1. The laser beam is made incident on the surface of the first polarization beam splitter 3 adjacent to the collimator lens 2, which is inclined with respect to optical path 1 of the laser beam in order to make the beam shape of the laser beam circular. Polarizing separating plane 3a of this first polarization beam splitter 3 transmits 80% of P polarized light and 2% of S polarized light respectively. It is noted that the linearly polarized laser beam that is emitted from the laser diode 1 is P polarized laser beam in relation to the polarizing separating plane 3a. The polarizing separating plane 3a can therefore transmit most of the P polarized laser beam that has been made incident on the first polarization beam splitter 3 to the magneto-optic disk D. This polarizing separating plane 3a also respectively reflects 20% of the P polarization component and 98% of the S polarization component of the laser beam incident on the first polarization beam splitter 3 after returning from the magneto-optic disk D.

The mirror 4 reflects the laser beam emitted from the first polarization beam splitter 3 in a direction perpendicular to the paper surface of FIG. 1 and directs the laser beam to the magneto-optic disk D from a perpendicular direction (in FIG. 1, for convenience, the optical path of the incident laser beam and the optical path of the reflected beam are drawn in the same plane). This mirror 4 tracks the magneto-optic disk D by sliding along the radial direction of the disk.

The objective lens 5 focuses the laser beam reflected by the mirror 4 to form a beam spot on the magnetic film of the magneto-optic disk D. This objective lens 5 is focused by a servo system, not shown. This objective lens 5 is also moved in the radial direction of the disk together with the mirror 4. In this embodiment, the emission means includes the laser diode 1, the collimator lens 2, the first polarization beam splitter 3, the mirror 4, and the objective lens 5 described above.

The direction of polarization of the laser beam that is reflected by the magnetic film of the magneto-optic disk D is rotated by Kerr effect by a predetermined angle from the P polarization direction, depending on the direction of magnetization of the magnetic domain where the beam spot is formed. In more detail, supposing a coordinate system of which the horizontal axis is taken as the P polarization direction and of which the vertical axis is taken as the S polarization direction, the direction of polarization of the laser beam is rotated by an angle +θ'k from the horizontal axis when the direction of magnetization of the magnetic domain is upward, while the direction of polarization of the laser beam is rotated by an angle −θ'k from the horizontal axis when the direction of magnetization of the magnetic domain is downward. The laser beam that has been so rotated by Kerr effect is reflected at the polarizing separating plane 3a of the first polarization beam splitter 3. Then, as mentioned above, the intensity of the component in the P polarization direction is reduced to 20%, while the component in the S polarization direction is reduced only to 98%. As a result, after this reflection, the rotational angle of the direction of polarization of the laser beam with respect to the P polarization direction by Kerr effect is increased. The rotational angle by Kerr effect magnified by reflection at the polarizing separating plane 3a is referred as +Aθ'k degrees =+θk degrees, or −Aθ'k degrees =−θk degrees.

Figure 3:
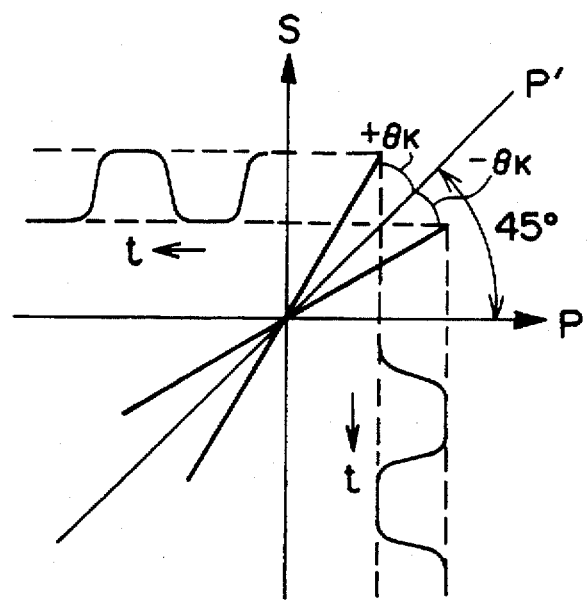
FIG. 3 is a graph showing the state of polarization of the laser beam after passing through the half-wave plate in the case where there is no phase difference.
Figure 4:
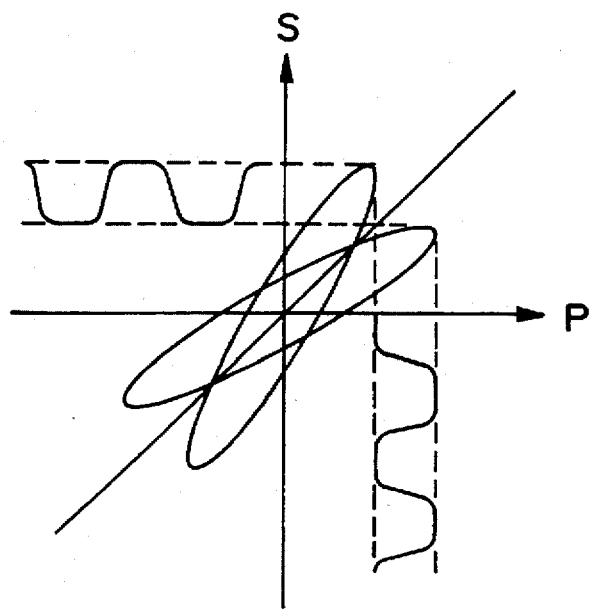
FIG. 4 is a graph showing the state of polarization of the laser beam after passing through the half-wave plate prior to phase compensation.

The half-wave plate 6, which acts as a retarder, is arranged in the optical path 1 at an angle of 22.5 degrees with respect to the P polarization direction. This half-wave plate 6 consists of a plane-parallel crystal plate, of which thickness is determined so that the phase difference of 180 degree is introduced to a laser beam crossing the plane-parallel surfaces thereof at a right angle. The half-wave plate 6 therefore rotates the direction of polarization of the incident laser beam by twice the angle between the direction of polarization and its optic axis. As a result, as shown in FIG. 3, the plane of polarization of laser beam in the P polarization direction is rotated by 45 degrees during passage of the laser beam through the half-wave plate 6, the rotated direction of the plane of polarization shown in FIG. 3 as the axis P'. Also, the direction of polarization of the laser beam passed through the half-wave plate 6 when the direction of magnetization of the magnetic domain where the laser beam is reflected is upward becomes (45−θk) degrees, while the direction of polarization of the laser beam passed through the half-wave plate 6 when the direction of magnetization of the magnetic domain is downward becomes (45+θk).

The second polarization beam splitter 7 is shaped as a triangular prism with an isosceles triangular surface, with its surface facing the half-wave plate 6 perpendicular to the optical path 1. The inclined surface of this second polarization beam splitter 7 constitutes a polarizing separating plane 7a. This polarizing separating plane 7a transmits 100% of the P polarization component and reflects 100% of the S polarization component. In other words, the polarizing separating plane 7a separates the incident laser beam into polarization components in directions respectively making angles of 45 degrees with respect to the average (P' direction) of its polarization directions. In this connection, the P polarization component and S polarization component mean components in each direction of the laser beam that has passed through the half-wave plate 6. An optical wedge 8 that becomes progressively thinner away from the half-wave plate 6 is cemented on the outside of this polarizing separating plane 7a. The outer surface of this optical wedge 8 is coated with a substance that reflects 100% of incident light. Consequently, the beam of the P polarization component that is made incident on this optical wedge 8 passes through the second polarization beam splitter 7 once more. The beam of the S polarization component and the beam of the P polarization component which are thus separated are emitted from the second polarization beam splitter 7 through the surface nearest the photodiodes 10 along different optical paths.

The condenser lens 9 is cemented on the surface of the second polarization beam splitter 7 nearest the photodiodes 10. Consequently, the beams of the components in the respective directions that are made incident to this condenser lens 9 along the respective optical paths are respectively focused by the condenser lens 9.

The first photodiode 10a, which acts as the photodetector means, detects the beam of the S polarization component and outputs an electrical signal corresponding to its variation of intensity. The electrical signal that is output from this first photodiode 10a is low level when the direction of magnetization of the magnetic domain at which the laser beam is reflected is upward and is high level when the direction of magnetization of the magnetic domain is downward. Correspondingly, the second photodiode lob as the photodetector means detects the beam of the P polarization component, and outputs an electrical signal corresponding to its variation of intensity. When the direction of magnetization of the magnetic domain at which the laser beam is reflected is upward, the electrical signal outputted from the second photodiode 10b is high level, but when the direction of magnetization of the magnetic domain is downward, it is low level. Comparing the output of the first photodiode 10a with the output of second photodiode 10b, their amplitude is the same and their variations are in inverse phase. Consequently, an electrical signal with large amplitude corresponding to the change in rotation of angle by Kerr effect can be obtained by taking the difference of these outputted signals. Also, in-phase noise such as the dark current of photodiodes 10a, 10b are cancelled. In order to take this difference, the outputted signals of the first photodiode 10a and the second photodiode 10b are inputted to a differential amplifier 11.

In each of the optical elements 2, 3, 4, 5, 7 in the optic path from laser diode 1 to second polarizing beam splitter 7, some degree of phase difference is removed beforehand. But, in order to keep costs down, the phase difference is not entirely removed. When the P polarization component and S polarization component are separated by the second polarization beam splitter 7, an appreciable amount of phase difference has therefore accumulated. In order to compensate for this phase difference, the plane-parallel surfaces of the half-wave plate 6 are tilted with respect to optical path 1 in the plane of the P polarization direction. This half-wave plate 6 has the characteristic that its phase difference can be varied in accordance with the optical path length in its interior. Consequently, if this half-wave plate 6 is suitably tilted with respect to optical path 1, the optical path length in its interior is varied, so the phase difference in the direction of the optical path 1 can be altered. In fact, the phase difference can be varied within a range of 180 degrees or more. This half-wave plate 6 is stuck on to the base plate B tilted with respect to the optical path 1 with an angle so that the phase difference in the direction of the optical path 1 is (180+φ) degrees, matched with the total phase difference (−φ) of the whole optical system from the laser diode 1 to the second polarization beam splitter 7. In other words, this half-wave plate 6 is rotated and adhesively fixed in position so that the length of the optical path within the half-wave plate 6 corresponds to the phase difference of the whole optical system from the laser diode 1 to the second polarizing beam splitter 7. It should be noted that if the half-wave plate 6 is made beforehand to have a thickness to produce a phase difference of less than 180 degrees, phase difference compensation within the range of about 180 degrees can be achieved by tilting this half-wave plate 6.

In this embodiment, it is not necessary to calculate the angle of the half-wave plate 6 needed to achieve compensation of the phase difference by measuring this phase difference of the whole optical system before the half-wave plate 6 is fixed on to base plate B. Rather, the output of the differential amplifier 11 is observed while the half-wave plate 6 is gradually rotated with respect to the optical path 1 with the laser beam emitted from the laser diode 1. Phase compensation has been achieved when the output of differential amplifier 11 has become a maximum. At this point, the inclination of the half-wave plate 6 with respect to the optical path 1 is fixed and this half-wave plate 6 is attached to the base plate B.

With this embodiment, phase compensation can be achieved simply by tilting the half-wave plate 6 that was conventionally employed in an information reproducing device so that the phase difference along the optical path 1 within the half-wave plate 6 has a value at which the phase difference caused by the whole optical system other than the half-wave plate is compensated. Therefore, there is no need to provide a special phase compensation element. Accordingly, there is no increase in size or weight of the device as a whole, and there is no increased cost due to increased number of components. Since phase compensation is effected only by the half-wave plate 6, the accuracy of the phase difference of the other optical elements can be lowered, which makes it possible to reduce costs.

Second Embodiment

Figure 2:
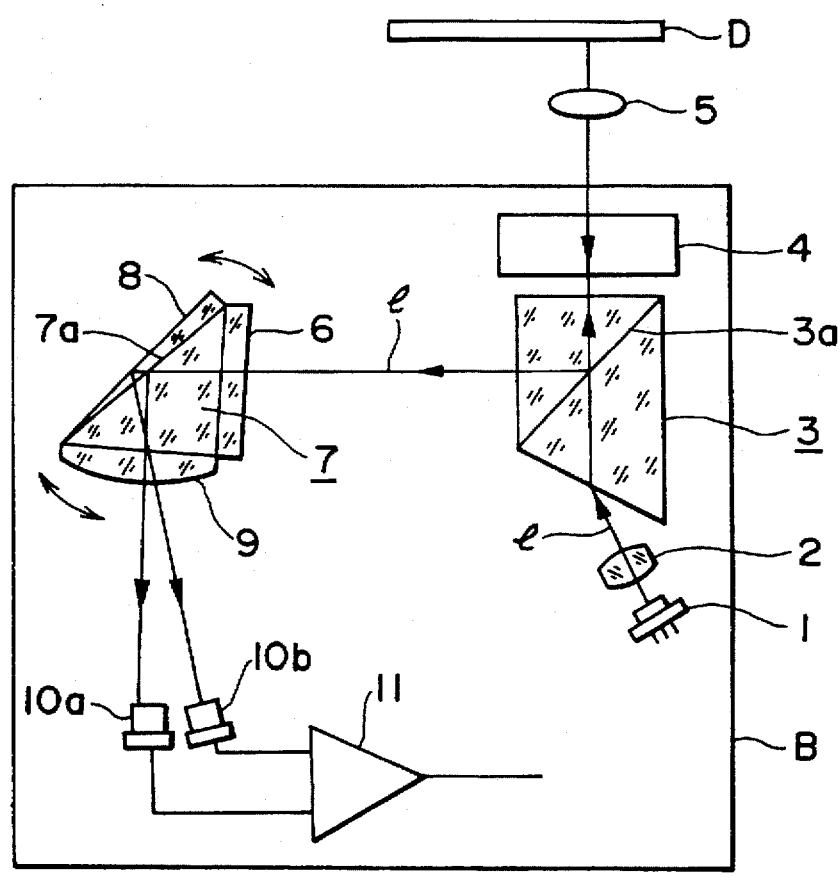
FIG. 2 is an optical layout diagram illustrating major parts of an information reproducing device according to a second embodiment of the present invention.

This second embodiment shows an example where a half-wave plate 6 is cemented on a surface of the second polarization beam splitter 7 as a separating optical element. FIG. 2 is an optical layout diagram showing only major parts of an information reproducing device according to the second embodiment. In this FIG. 2, structures that are the same as in FIG. 1 are given the same reference numbers.

As shown in FIG. 2, half-wave plate 6 of this embodiment is attached on the surface of second polarizing beam splitter 7. The half-wave plate 6 is therefore tilted with respect to optical path 1 by rotating together with the second polarization beam splitter 7 (and the optical wedge 8 and the condenser lens 9) in the plane of P polarization.

The rest of the construction and the function of this second embodiment is the same as in the first embodiment, so description which would be duplicate is omitted.

With an information reproducing device according to the present invention constructed as described above, phase compensation can be achieved using some of the optical components that were conventionally employed, without increasing the number of components or costs; as a result, a high S/N ratio can be obtained.

What is claimed is:

1. An information reproducing device, comprising:

means for irradiating linearly polarized light on a magnetic film of a magneto-optic disk;

a retarder that optically rotates the polarized light, said retarder being tilted with respect to an optical axis of the polarized light that is reflected by the magnetic film;

a separating optical element that separates at least one polarization component in a predetermined direction from the polarized light that has passed through the retarder; and means for detecting the at least one polarization component of the polarized light separated by the separating optical element.

2. An information reproducing device according to claim 1, wherein said retarder is arranged so that a phase difference introduced by the optical path of the polarized light within the retarder cancels a phase difference of the entire optical system, other than the retarder, from the irradiating means to the detecting means.

3. An information reproducing device according to claim 1, wherein said retarder is arranged so that a phase difference introduced by the retarder coincides with a value obtained by, from 180 degrees, subtracting a phase difference caused by the entire optical system, other than the retarder from the irradiating means to the detecting means.

4. The information reproducing device according to claim 1, said retarder being tilted to substantially cancel a phase difference of an optical system of the information reproducing device.

5. An information reproducing device according to claim 1, wherein said separating optical element separates the polarized light into two orthogonal polarization components, and wherein said detecting means detects said polarization components.

6. An information reproducing device according to claim 5, wherein a direction of the polarization components that are separated from the polarized light by the separating optical element make angles of 45 degrees with respect to a direction which is an average of polarization directions of the polarized light.

7. An information reproducing device according to claim 1 wherein said retarder is a half-wave plate.

8. An information reproducing device according to claim 7, wherein the half-wave plate is arranged so as to rotate a polarization direction of the polarized light irradiated by the irradiating means by 45 degrees.

9. An information reproducing device according to claim 7, wherein the half-wave plate and the separating optical element are cemented.

10. An information reproducing device comprising:

means for irradiating linearly polarized light on a magnetic film of a magneto-optic disk;

a separating optical element which separates at least one predetermined polarized component of the polarized light reflected at the magnetized film;

a photoelectric conversion element that converts the light intensity of the at least one predetermined polarization component that is separated by the separating optical element into an electric signal; and a retarder, positioned between the magnetic film and the separating optical element, and inclined with respect to an optical path of the polarized light so that the amplitude of the electric signal output from the photoelectric conversion element is a maximum.

11. An information reproducing device according to claim 10, wherein said retarder is arranged to introduce phase difference of 180 degrees to the polarized light.

12. An information reproducing device comprising:

means for irradiating linearly polarized light on a magnetic film of a magneto-optic disk;

a separating optical element that separates, from polarized light that is reflected by the magnetic film, a polarization component in a direction at an angle of +45 degrees with respect to the average of the polarization direction and a polarization component in a direction at an angle of −45 degrees with respect to the average;

first and second photoelectric conversion elements which respectively converts the light intensity of the polarization components separated by the separating optical element into electric signals;

a differential amplifier that outputs the difference between the electric signal output from the first photoelectric conversion element and the electric signal output from the second photoelectric conversion element; and a retarder arranged between the magnetic film and the separating optical element, said retarder tilted with respect to the optical axis of the polarized light.

13. An information reproducing device according to claim 12 wherein the retarder introduces a phase difference of 180 degrees to the polarized light.

\* \* \* \* \*